E. B. FORBUSH.
2 Sheets—Sheet 1.
Harvester.
No. 1,974.
Reissued May 23, 1865.
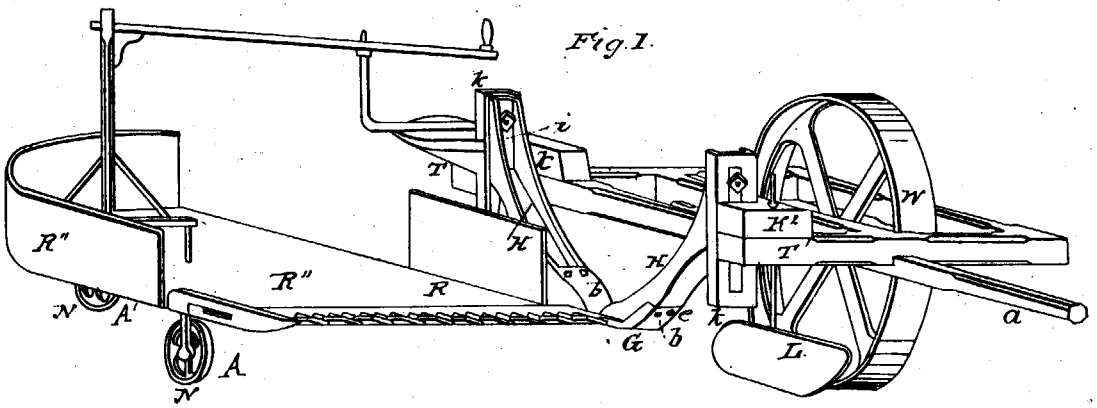
Witnesses
James H. Gridley
Allen T. Jumpton
Inventor
E. Wheeler Jr
By E. B. Forbush
Atty.
N. PETERS, Photo-Lithographer, Washington, D. C.

E. B. FORBUSH.
2 Sheets—Sheet 2.
Harvester.
No. 1,974.
Reissued May 23, 1865.
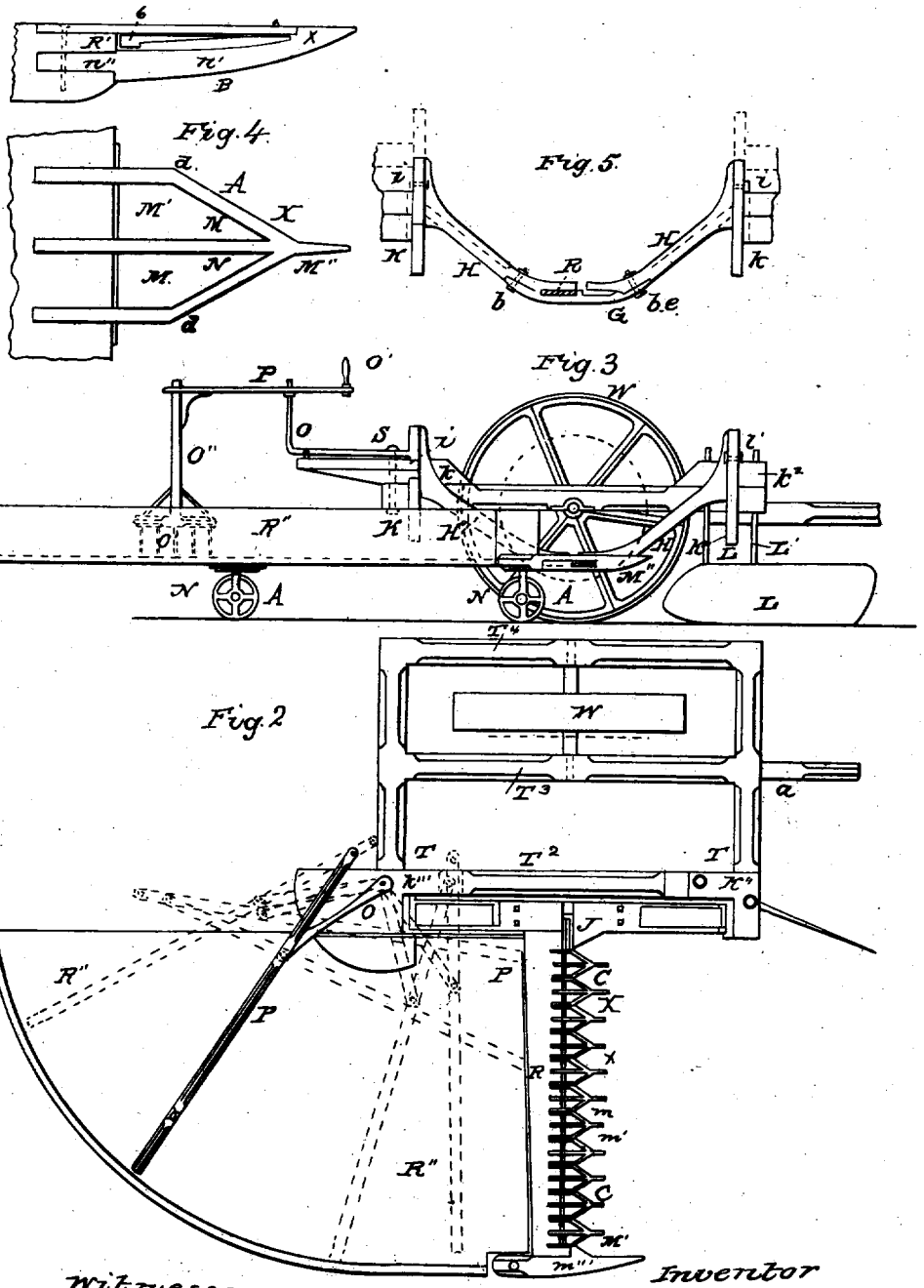
Witnesses
James H. Gindley
Alfred T. Sampston
Inventor
C. Wheeler Jr
By E. B. Forbush
Atty.
N. PETERS, Photo-Lithographer, Washington, D.C.

UNITED STATES PATENT OFFICE.

CYRENUS WHEELER, JR., OF POPLAR RIDGE, NEW YORK, ASSIGNEE, BY MESNE ASSIGNMENTS, OF E. B. FORBUSH.

IMPROVEMENT IN HARVESTERS.

Specification forming part of Letters Patent No. 9,134, dated July 20, 1852; Reissue No. 376, dated July 8, 1856; Reissue No. 692, dated April 19, 1859; Reissue No. 1,974, dated May 23, 1865.

DIVISION C.

*To all whom it may concern:*

Be it known that ELIAKIM B. FORBUSH, of the city of Buffalo, in the county of Erie and State of New York, heretofore invented certain new and useful Improvements in Grain and Grass Harvesting Machines, for which Letters Patent of the United States were granted and issued to the said FORBUSH on the 20th day of July, 1852, and subsequently reissued on the 8th day of July, 1856, and again reissued on the 19th day of April, 1859, but which said last-mentioned Letters Patent are now deemed to be invalid and inoperative by reason of a defective or insufficient specification; now, therefore, I, CYRENUS WHEELER, Jr., of Poplar Ridge, in the county of Cayuga and State of New York, assignee, by mesne assignments, of the whole interests of the said Letters Patent and of said invention and improvements, do hereby declare, pursuant to the statute in such case made and provided, that the following is a full and exact description of integral parts of said invention and improvements so far as described and claimed in this division or branch thereof, reference being had to the accompanying drawings, making a part of this specification, in which—

Figure I is a perspective view of said improvements as shown in a combined reaper and mower adjusted and arranged for reaping. Fig. II is a plan or top view of the same. Fig. III is a side view. Fig. IV is a plan or top view and a side view of one of the guard-fingers. Fig. V is a side view of a device called a "clamp," by which the finger-bar is supported and adjusted.

The nature of said invention, so far as the same relates to this branch or division thereof, consists in the construction of a quadrant-shaped grain-platform and in its connection with the machine and locating it in rear of a line drawn through the front of the main wheel, so that the grain may be delivered at the side of the platform and in rear of the main frame.

To the front of the finger-bar R′ are attached guard-fingers, through which the cutters work and against which the stalks of grain and grass are cut. These are fully described in Division B. The cutters are operated in the usual manner by suitable mechanism connected with the driving-wheel.

Connected with the finger-bar R′, and in rear of it, is the grain-platform R″, for receiving the cut grain. It it made quadrant-shaped, as clearly shown in the drawings, and has its point of delivery at its side and behind or in rear of the main frame.

The cutting apparatus, (including the finger-bar,) and with it the grain-platform, are connected to the main frame by means of the clamp-shoe or other suitable device, so as to occupy a position in rear of a line drawn through the front of the main wheel W, the cutters being nearly opposite the center of the driving-wheel. The finger-bar is what is called a "short finger-bar"—that is, it only exceeds the length of the cutting apparatus at its inner end sufficiently to admit of its being connected (by means of a shoe or otherwise) to the grain side of the main frame near the cutters, so as to give the least possible bearing on the ground when the platform is removed and the machine used for mowing. By this arrangement of the cutting apparatus and platform relatively to the driving-wheel the point at which the grain is cut and falls upon the platform is brought nearer to the point of delivery (which is behind the main frame, or substantially so) than in a machine where the cutting apparatus is located in front of a line passing through the front of the main wheel. Consequently the delivery-path in which the cut grain must travel is shorter and the arc of its circle less, while sufficient space is obtained to permit the grain to be turned upon the platform and discharged therefrom in gavels upon the ground in rear of the main frame and at the side of the platform, and in a position nearly at right angles to that in which it falls upon the platform, the butts of the gavels lying toward and the heads from the delivery side of the platform. By thus bringing the point of cutting and the point of delivery nearer together than has been done in other machines less expenditure of power is required to deliver the grain than in a machine having its cutting apparatus in front of the wheel. The gavels, when delivered from the platform in the position described, are far enough from the standing grain to permit the passage of the team and machine in the succeeding swath without striking the gavels, thereby avoiding the necessity of the binding or removal of the gavels before finishing cutting the field. The position in which the gavels lie when thus discharged is such that the binder, in passing from one gavel to another in the process of binding, approaches the gavels at their side, which diminishes the labor and facilitates the work.

The raking of the grain from the platform may be done by an ordinary hand-rake, or an automatic raking device may be applied and used, which device will be described in Division D.

Having now described the said invention so far as the same relates to this branch or division thereof, what I claim as the invention of the said FORBUSH, and desire to secure by these Letters Patent, is—

In combination with a short finger-bar and a shoe, by which it is connected to the main frame of the machine, and a cutting apparatus located in rear of a line drawn through the front of the driving-wheel, a quadrant-shaped platform so arranged that the cut grain may be delivered therefrom at the side of the platform and in rear of the main frame, substantially as set forth.

In testimony whereof I hereunto subscribe my name in the presence of two witnesses.

C. WHEELER, JR.

Witnesses:
W. H. MEAKER,
WM. ALLEN.